Oct. 9, 1962   J. A. LAUCK   3,057,303
PRESSURE LOADED GEAR PUMP
Filed April 15, 1959   3 Sheets-Sheet 1

INVENTOR.
JOHN A. LAUCK
BY J.C. Wiessler
ATTORNEY

INVENTOR.
JOHN A. LAUCK
BY J.C. Wiessler
ATTORNEY

Oct. 9, 1962 J. A. LAUCK 3,057,303
PRESSURE LOADED GEAR PUMP
Filed April 15, 1959 3 Sheets-Sheet 3

INVENTOR.
JOHN A. LAUCK
BY *J. C. Wiessler*
ATTORNEY

United States Patent Office 3,057,303
Patented Oct. 9, 1962

3,057,303
PRESSURE LOADED GEAR PUMP
John A. Lauck, Benton Harbor, Mich., assignor to Clark Equipment Company, a corporation of Michigan
Filed Apr. 15, 1959, Ser. No. 806,566
23 Claims. (Cl. 103—126)

This invention relates to a pressure loaded gear pump and more particularly to an arrangement for insuring balanced thrust plates in a pressure loaded type gear pump.

In a pressure loaded, intermeshing gear pump having one or more sets of axially movable, pressure loadable thrust plates, discharge pressure of the pump, or a part thereof, is commonly applied to the rear or motive surface of the thrust plates to urge them into sealing engagement with their associated gears. Ordinarily in such gear pumps the motive surfaces of the thrust plates to which discharge pressure is directed will be substantially uniformly subjected to such pressure throughout the entire area; that is, at any point on the motive surface of the thrust plates the same pressure will exist. However, the forward sealing or gear side engaging surface of the thrust plates is subjected to a pressure gradient which extends from the inlet pressure in the area adjacent the pump inlet, which is the lowest pressure of the gradient, to the discharge pressure in the area adjacent the discharge side of the pump, which is the highest pressure level in the gradient. Accordingly, it will be apparent that while the total pressure force which acts on the motive surface of each thrust plate may be made to equal the total pressure force which acts on the forward surface of the thrust plate, the pressure acting on particular areas of the forward surface of each thrust plates will not be uniform; that is, the portion of the forward surface near the inlet will be subject to less pressure tending to break the seal than the portion of such surface near the outlet of the pump. This unbalanced pressure condition tends to twist the pump thrust plates and results in uneven wear, thereby increasing the power required to turn the pump. Wear is concentrated, of course, in the area of the pump where the thrust plates tend to twist against the side face of the adjacent gear.

"Inlet pressure side," as used herein, refers generally to that portion of the pump which is subject to inlet pressure or substantially inlet pressure. By way of example only, in the pump shown in FIGURE 2 the "inlet pressure side" is approximately that portion of the pump to the left side of a plane through the gears extending from a location adjacent the outer periphery of one of the gears near the location where the gear pockets are subjected to discharge pressure, to the center of that gear, thence to a location adjacent the location where the gears break mesh, then to the center of the other gear from which the plane extends to a location adjacent the outer periphery of the other gear which corresponds to the location of origin of the plane relative to the first-mentioned gear. The approximate plane of division between the inlet and discharge pressure sides, in accordance with the above example, is represented in FIGURE 2 by the broken line ABCDE. The "discharge pressure side" is approximately that portion of the pump to the right of the plane of line ABCDE.

Different means have been used in the past with varying degrees of success in attempts to satisfactorily solve the problem of accelerated pump wear, as aforesaid.

For example, it is known that this unbalanced pressure condition can, to some extent, be reduced by providing balance grooves on the gear face engaging surface of each thrust plate radially outwardly of the root diameter of the gears, which grooves communicate at one end with the discharge side of the pump and extend circumferentially towards the inlet of the pump but terminate short thereof.

As previously employed, however, such balance grooves have never been extended completely around the thrust plate since, it has been heretofore presumed by persons skilled in the art, such construction would provide a leakage path to the inlet side of the pump from the outlet side with a consequent loss of pressure. Thus, while balance grooves have been helpful they have not heretofore been utilized to afford a properly balanced pump.

An important object of the present invention, therefore, is to provide a new and improved pressure loaded type, intermeshing gear pump utilizing an improved balance groove construction for effecting a more nearly perfectly balanced pump.

In carrying out the above object, I provide a form of balance groove construction which includes a circumferentially extending portion located radially inwardly of the root diameter of the gear teeth on the inlet pressure side of the pump and formed on the sealing or gear face engaging surface of the thrust plate. In a preferred embodiment of this construction the balance groove or recess on the inlet pressure side of the pump, as aforesaid, is interconnected at both of its ends with a circumferentially extending balance groove or recess located radially outwardly of the root diameters of the gear teeth. The radially outwardly located balance groove is also formed in the sealing surface of the thrust plate and communicates at one end with the discharge side of the pump and extends toward the inlet port of the pump but terminates short thereof.

A number of significant advantages inhere in this construction. For example, discharge pressure fluid is permitted to circulate continuously from the discharge side of the pump into the balance groove, thence toward the inlet side from which the discharge pressure fluid flows into and through the radially inwardly located balance groove, from whence it returns to the discharge side of the pump by way of a continuation of the groove. If the balance groove which extends around the thrust plate on the inlet pressure side of the pump is or can be made sufficiently large in area a substantially perfectly balanced pump may be readily constructed.

Also, the continuous circulation of fluid through the balance groove tends to lubricate the mating surfaces of the thrust plate and gear, as well as to dissipate the heat generated as a result of relative rotative contact of the mating surfaces. Also, and importantly, as aforesaid, this embodiment of the invention affords improved and greatly simplified means for balancing pumps of the type contempltaed.

It has also been proposed heretofore to employ eccentrically disposed thrust plates or bushings whereby the pressure area at the back of the thrust plates is offset with respect to the uniformly disposed surface at the forward surface of the thrust plates so as to compensate, in effect, for the pressure gradient extending across the forward surfaces of the thrust plates. Alternatively, it has been proposed to restrict the area exposed to loading pressure at the back of the thrust plates. Again, various seal arrangements for restricting the loading area at the back of each thrust plate to compensate for the pressure gradient across the forward surface of the thrust plate have been proposed.

In addition, it has been proposed that the aforesaid pressure gradient be compensated for by providing each thrust plate with discharge pressure responsive means to direct the resulting discharge pressure forces in such a manner that these forces tend to move the associated thrust plate toward the adjacent gear face at an area adjacent the discharge side of the pump.

I have devised in a second embodiment of this invention a construction wherein this pressure gradient is compensated for by providing each thrust plate with means responsive to pump discharge pressure such that the resulting discharge pressure forces tend to move the thrust plate away from the adjacent gear face at an area in or adjacent the inlet pressure side of the pump. It has been found that substantially improved results are attained over the aforementioned known constructions in reducing the wear and tendency to seize of the pump parts, in providing an accurately controllable balanced condition between the thrust plates and abutting gears, in simplifying the manufacturing process, and in reducing the cost of manufacture.

Accordingly, it is another important object of the present invention to provide a new and improved pressure loaded type, intermeshing gear pump wherein each pressure loadable thrust plate is urged away from the adjacent gear side face at an area in or adjacent the inlet pressure side of the pump during operation thereof so as to compensate for the pressure gradient over the gear side face engaging surface of the thrust plate.

In accordance with the latter embodiment of the invention, the means for exerting forces which urge each thrust plate axially away from the adjacent gear side face in an area in or adjacent the inlet pressure side of the pump comprises piston or equivalent means associated with each of the thrust plates on the motive surface thereof (which is the surface on the side opposite to the sealing surface) whereby the discharge pressure forces urge the piston means away from the adjacent gear to compensate for the aforesaid pressure gradient. One or a plurality of such piston or equivilent means may be utilized, as may be required.

The latter embodiment avoids difficult manufacturing problems and high manufacturing cost which are inherent, for example, in prior constructions utilizing such arrangements as eccentrically disposed thrust plates, restriction of the area exposed to discharge pressure at the back of the thrust plates, various seal arrangements for restricting the loading area at the back of the thrust plates, and the like, as aforesaid. It also constitutes a most significant step forward in a crowded art over a construction wherein means are provided to increase the forces acting at the discharge side of the thrust plate in order to compensate for the pressure gradient. The latter construction creates additional problems of wear, as well as increasing the likelihood of seizure of the pump parts during operation.

It should be understood that the above generally described first and second embodiments of this invention may be used either independently one of the other, or in combination. As to the latter, it is contemplated that both the improved balance groove construction and the balance piston or compensating thrust means may be utilized together in the same pump.

Accordingly, it is a further important object of the present invention to provide a combination of pressure gradient compensating means in pumps of the type contemplated which, together, may readily afford a substantially perfectly balanced pump.

It is also an object of the present invention to provide as a new article of manufacture a thrust plate for use with gear pumps.

It is a further object of the present invention to provide a generally improved pressure loaded type, intermeshing gear pump.

Other objects and advantages of the present invention will be apparent from the following detailed description taken in conjunction with the drawings wherein.

Figure 1:
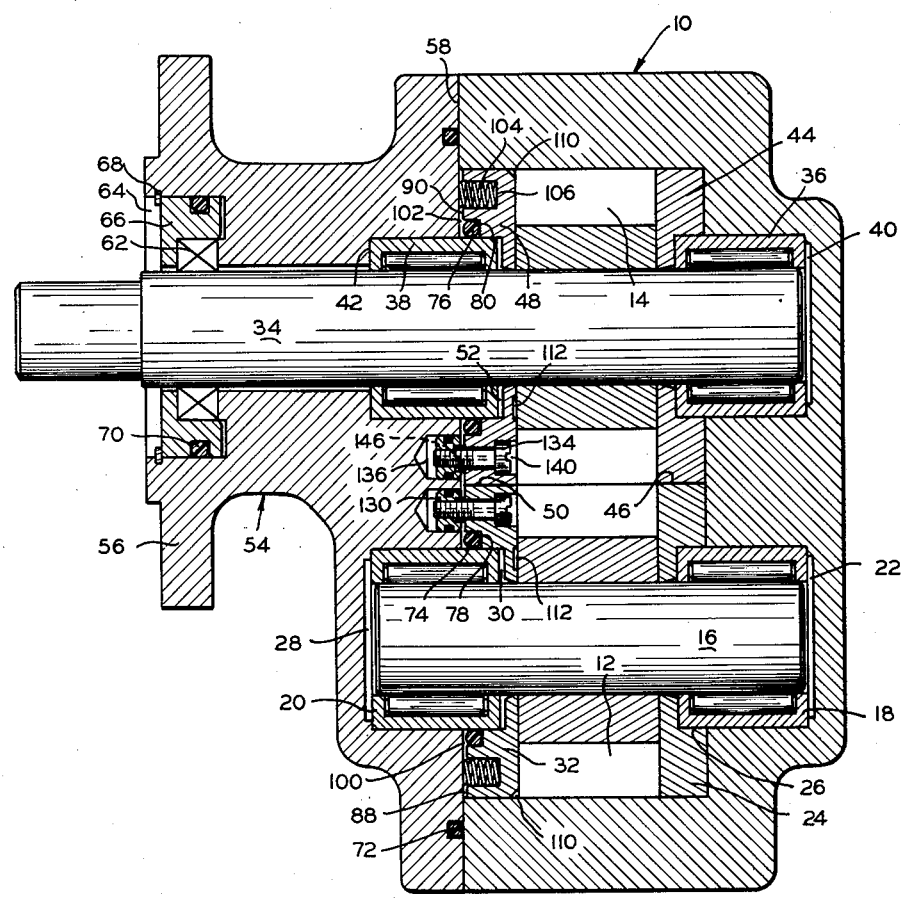
FIGURE 1 is a sectional view of a pressure loaded type, intermeshing gear pump taken along line 1—1 of FIGURE 2 in accordance with one embodiment of the present invention.

Referring now in detail to the drawings, the numeral 10 denotes a suitably chambered gear pump housing in which are rotatably mounted a driven gear 12 and an intermeshing driving gear 14. Driven gear 12 is supported on a shaft 16 journaled on its right side in a roller bearing 18 and on its left side in a roller bearing 20. Roller bearing 18 is located in a chamber 22 formed in the pump housing and is maintained in position by a fixed thrust plate 24 located intermediate bearing 18 and gear 12 and providing an annular recess 26 in registry with the left end portion of the bearing. The bearing member 20 is located in a housing chamber 28 and is located in registry with an annular recess portion 30 of an axially movable or floating relatively thin disc-shaped thrust plate 32 intermediate said bearing and the one side face of gear 12.

Driving gear 14 is mounted for rotation upon a drive shaft 34 journaled on its right side in a roller bearing 36 and intermediate its ends in a roller bearing 38, said roller bearing being mounted in chambers 40 and 42, respectively, in a manner similar to the mounting of bearings 18 and 20. A fixed thrust plate 44 is mounted intermediate gear 14 and bearing 36 in a manner similar to the mounting of thrust plate 24, said plates 24 and 44 mating in sealing relationship along complementary flat surfaces thereof indicated at numeral 46. An axially movable or floating relatively thin disc-shaped thrust plate 48 is mounted intermediate gear 14 and bearing 38 in a manner similar to the mounting of movable thrust plate 32, said movable thrust plates abutting in sealing relationship along complementary flat surfaces thereof as indicated at numeral 50. A recess 52 is formed in thrust plate 48 and receives one end portion of bearing 38. The construction of thrust plates 32 and 48 will be described in detail hereinafter.

A cover body 54 having an adapter connecting flange 56 and a mating surface 58 is secured to the pump body 10 by means of a plurality of bolts, not shown, adapted to be received in threaded openings 60 in pump body 10.

A shaft seal 62 is located in an enlarged chamber 64 of cover body 54 between a seal retainer member 66 and a portion of the cover body 54. A snap ring 68 locates seal retainer 66 in chamber 64. A plurality of O-rings are mounted in annular grooves formed in various parts of the pump construction to provide sealing means. The O-ring 70 provides a seal between retainer member 66 and cover body 54; O-ring 72 provides a seal between the pump body 10 and the cover body 54. O-rings 74 and 76 are located in recesses 78 and 80 of thrust plates 32 and 48, respectively, and provide seals between the thrust plates and bearing members 20 and 42, respectively.

Figure 2:
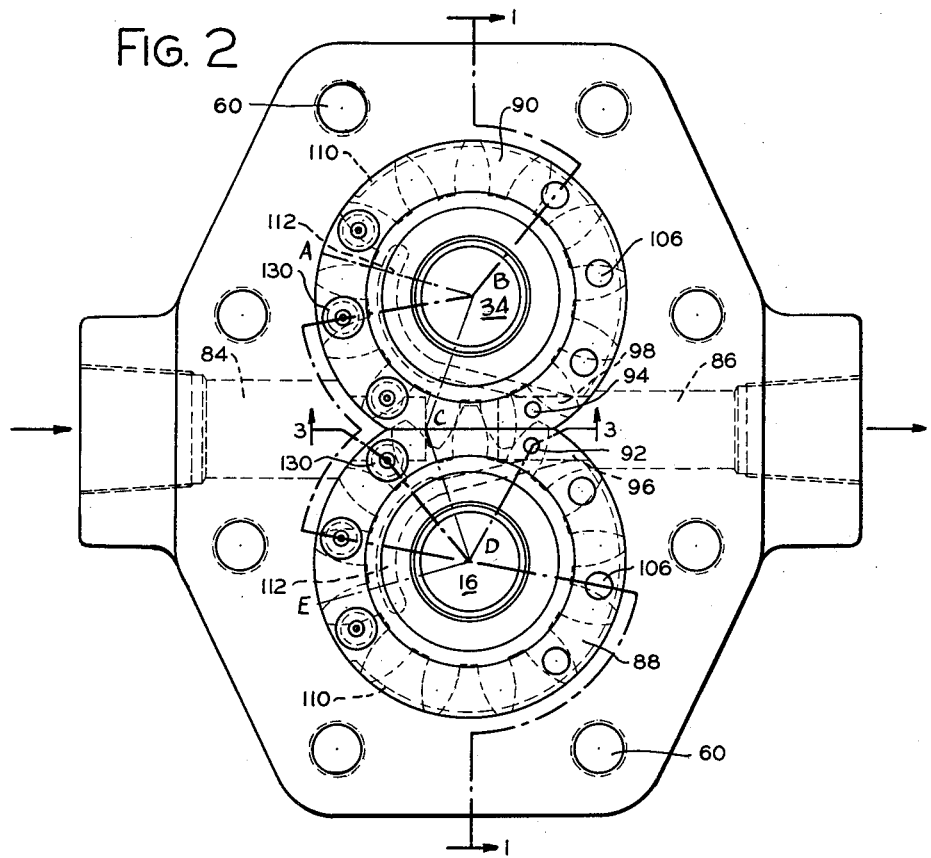
FIGURE 2 is an elevational view of the pump taken from the left end of FIGURE 1 with the cover body removed.

As shown in FIGURE 2, the pump body 10 has an inlet conduit 84 formed in its left side and an outlet conduit 86 formed in its right side. Pressure generated by the gears is communicated from the outlet or discharge side of the pump to rear or motive surfaces 88 and 90 of the thrust plates 32 and 48, respectively, through passages 92 and 94 in said thrust plates. The passages 92 and 94 open in recesses 96 and 98 on the discharge side of the pump, said recesses being formed in the forward or sealing side surfaces of the thrust plates 32 and 48. These recesses insure continuous communication of the passages with full discharge pressure. The discharge pressure fluid is directed through passage 92 into a pressure chamber 100 which is formed between surface 58 of cover body 54 and the motive surface of thrust plate 32, and is directed through passage 94 into a chamber 102 which is formed between the said cover body surface and the motive surface of thrust plate 48. Discharge pressure is applied uniformly in chambers 100 and 102 to maintain the forward sealing surfaces of opposed thrust plates 44 and 48 in sealing relationship with the abutting side surfaces of gear 14, and, likewise, the forward facing surfaces of thrust plates 24 and 32 are maintained in sealing relationship with the opposed side faces of gear 12. In order to provide an initial seal between the sealing surfaces of the thrust plates and the side faces of the gears, a plurality of compression springs 104 are disposed in recesses 106 formed in the peripheral portion of each of the thrust plates 32 and 48.

In accordance with the present invention, as discussed hereinbefore in somewhat general terms, there is formed in the forward sealing face of each floating thrust plate a balance groove which extends circumferentially of the forward side and radially outwardly of the root diameter of the adjacent gear. The groove communicates with discharge pressure fluid at the discharge side of the pump and extends toward the inlet pressure side of the pump but terminuates short thereof. A second balance groove, preferably larger in cross section than the first mentioned groove, is also formed in the forward face of the thrust plate and extends circumferentially thereof on the inlet pressure side of the pump, being located radially inwardly of the root diameter of the adjacent gear.

Figure 5:
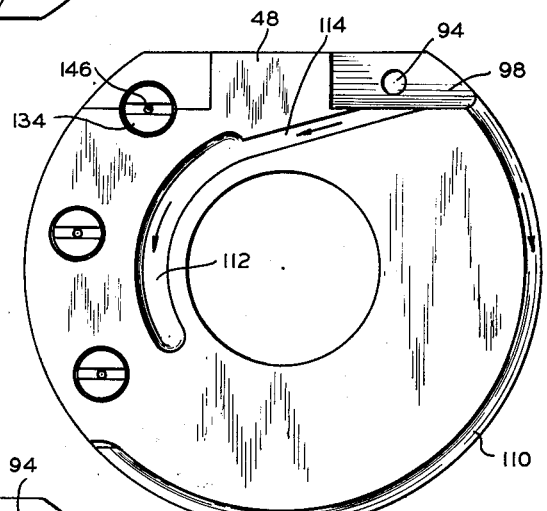
FIGURE 5 is a view in elevation of the sealing surface side of the thrust plate shown in FIGURE 4.

In the embodiment illustrated in FIGURES 1, 2 and 5 the first mentioned balance groove comprises a chamfered portion 110 which communicates with recess 98 on the discharge side of the pump and which extends circumferentially, as shown, to a position short of the inlet pressure side of the pump. The second mentioned balance groove is illustrated at numeral 112. It communicates with recess 98 by way of groove 114.

Figure 6:
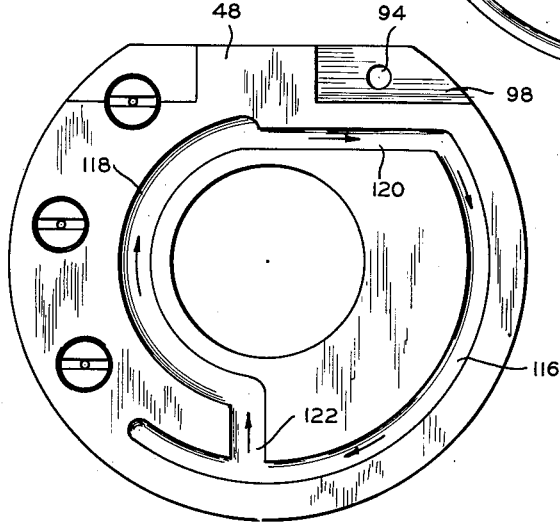
FIGURE 6 is a view in elevation of a second embodiment of the sealing surface side of a thrust plate.

A modified balance groove construction is illustrated in FIGURE 6. The first above mentioned groove comprises a recess 116 formed in the forward sealing face of the floating thrust plate and intermediate the gear root diameter and the outer periphery of the thrust plate. Recess 116 is adapted to communicate outlet pressure fluid to the gear tooth pocket sections on the discharge side of the pump, the same as in the FIGURE 5 embodiment. A balance groove extending circumferentially on the inlet pressure side of the pump is illustrated at numeral 118. It is connected at its one end to groove 116 by means of a groove 120 and at its opposite end to groove 116 by means of a groove 122.

Preferably, the balance groove construction of the floating thrust plates 32 and 48 is the same in any given pump design. Numerous variations within the scope of my invention are possible as between different pump designs, as will be apparent to persons skilled in the art, the foregoing embodiments being merely illustrative of the invention in this regard. In contemporary gear pump designs utilizing floating thrust plates it will frequently be found that the pressure gradient which exists across the forward face of each floating thrust plate will not be fully compensated by the introduction of discharge pressure fluid in pump inlet balance grooves such as 112 or 118. Primarily, the reason for this is that insufficient balance groove area is normally available on this side of the pump because of the relatively small dimension between the root diameter of the gear and the rotating shaft upon which it is mounted. Of course, in any particular pump design in which adequate area is available on the sealing surface of the thrust plate radially inwardly of the gear root diameter, such balance groove design as aforesaid affords a greatly simplified and low-cost construction which is available to substantially eliminate the pressure gradient.

It will be understood that in a gear pump of the type contemplated, fluid at discharge pressure is communicated throughout the pressure chamber (numeral 100 in FIGURE 3) between the motive surface of the thrust plate and the opposing surface of cover body 54, such pressure fluid being uniformly and continuously applied during operation of the pump to motive surface 88 (FIGURE 3) to urge the sealing surface of thrust plate 32 into sealing engagement with the abutting side face of the gear with equal axial thrust at all points on the motive surface. However, due to the pressure gradient which extends across each thrust plate sealing surface from inlet pressure on the inlet side to discharge pressure on the discharge side, the sealing pressure differential across the inlet pressure side of the thrust plate, is substantially greater than the pressure differential across the discharge pressure side. As pointed out above, if the total effective area of the inlet pressure side balance groove 112 or 118 is made sufficiently large, the resulting total force acting on the sealing surface of the inlet pressure side of the thrust plate will be sufficient to compensate the aforesaid pressure gradient, and the thrust plate will be in proper balance with important attendant advantages, as is known.

In order to provide a properly balanced thrust plate in pump constructions wherein the inlet and discharge pressure side balance grooves alone are insufficient, I have devised an extremely novel piston or motive surface means which is adapted to be utilized either solely or in combination with the inlet pressure side balance grooves. As illustrated, three such piston means have been provided in association with each of the floating thrust plates, although, of course, more or less than this number may be used, as required. A piston construction is illustrated best in FIGURE 3 wherein a piston head 130 is threadedly connected to a piston stem 132 having an enlarged slotted head portion 134 at the one end thereof. A recess 136 is formed in cover body portion 54 for receiving piston head 130, opposite sides of the piston head being preferably sealed one from the other by means of an O-ring 138 located in an annular recess of the piston head. A generally T-shaped recess 140 extends through the thrust plate in axial alignment with recess 136 when the thrust plate is assembled in the pump body. The piston stem 132 extends through the recess 140. The piston head is adjusted axially of piston stem 132 preferably as illustrated and provides a recess 142 in which is mounted a spring 144 which urges the piston head axially outwardly of the recess 140. A passage 146 extends through stem 132 and communicates recess 136 with inlet fluid pressure in recess 140 when the pump is in operation. Of course, a passage for connecting recesses 136 and 140 can, alternatively, be provided in the pump housing, although the embodiment as illustrated is preferred. Passage 146 is for the purpose of venting any high pressure fluid which leaks from chamber 100 through O-ring 138 and into recess 136 back to the inlet side of the pump. Without such venting leakage fluid pressure in recess 136, would tend to increase to the value of discharge pressure in chamber 100, which condition would nullify the compensating effect of the piston means.

Figure 3:
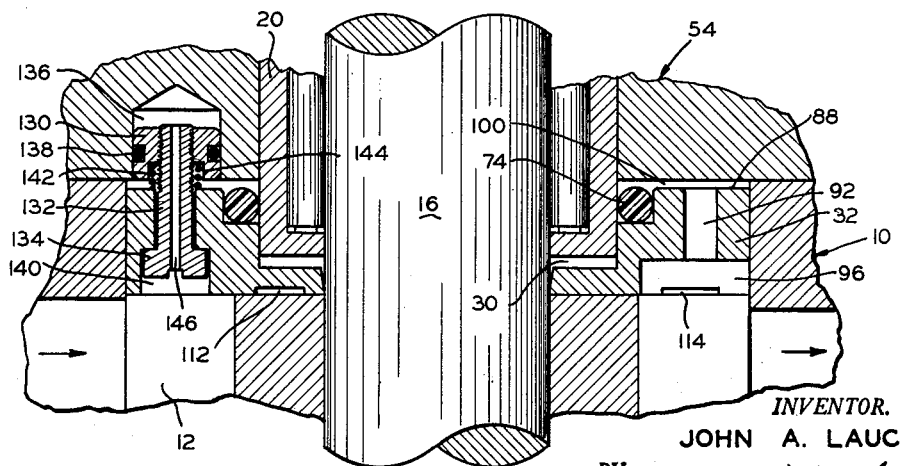
FIGURE 3 is a broken-away, enlarged sectional view taken along line 3—3 of FIGURE 2.
Figure 4:
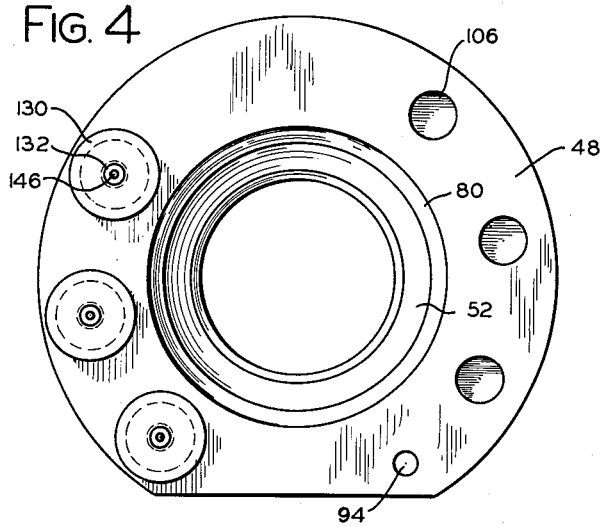
FIGURE 4 is a view in elevation of the motive surface side of a preferred embodiment of a thrust plate.

For the purpose of illustration section 3—3 of FIGURE 2, which comprises FIGURE 3, is taken through that piston means on thrustplate 32 which is nearest inlet conduit 84, and, as is well known, the inlet fluid pressure which is present during operation in this pump area is normally less than zero gage pressure. Therefore, in normal operation a partial vacuum exists in this inlet area of the pump. As a result the inlet side of the thrust plate is subjected to a differential pressure which is the highest pressure in the gradient extending from the discharge to the inlet side of the pump. Piston means 130, 132 functions to compensate for this pressure gradient by applying a force or in adjacent the inlet pressure side of the pump in a direction which tends to move the thrust plate away from the adjacent gear face. This result is achieved in the application of discharge pressure fluid upwardly, as viewed in FIGURE 3, against the lower or motive surface of piston head 130 in chamber 100. The total force applied against said surface of the piston head is reacted against by the the shoulders of recess 140, thereby tending to force this side of the thrust plate away from the adjacent gear side face. The differential pressure which acts upwardly across each piston head 130 is substantially equal to the differential pressure which acts downwardly across the thrust plate. By proper selection of the location of the effective pressure responsive area and of the number of piston means, it will be apparent that the pressure gradient may be entirely compensated for with the important attendant advantages discussed hereinabove.

It will be understood that the piston means may be alone utilized to compensate the pressure gradient, although, as disclosed in the drawings, a balance groove on the inlet pressure side of the pump is illustrated in combination with such piston means. The latter construction is preferred, and has been found in practice to afford a substantially perfectly balanced pump.

To summarize, in the operation of a gear pump of the general type herein described, the pressure gradient which extends across the forward gear engaging surface of each thrust plate from a low pressure value corresponding to the inlet pressure of the pump to a high pressure value corresponding to the discharge pressure of the pump tend to cause the floating thrust plates to engage the gear side face with substantially greater force adjacent the inlet side. This unbalanced results in greater wear and, more particularly, in uneven wear resulting ultimately in accelerated deterioration of the pump.

In accordance with the present invention, this unbalanced pressure condition is compensated for by either or both of two methods.

First, balance grooves are formed in a certain manner on both the inlet and discharge pressure sides of the forward sealing surface of each thrust plate so as to communicate with and/or circulate discharge pressure fluid, whereby to compensate the pressure gradient at least in part. By interconnecting the aforementioned balance grooves in order to circulate discharge pressure fluid in the manner shown by the arrows in FIGURE 6, benefits in addition to pressure gradient compensation accrue, including dissipation of heat generated between the relatively rotating mating metal faces, and lubrication of the said mating faces.

In addition, or as an alternate construction to the balance grooves of the thrust plates, piston means are effective on the inlet pressure side of the thrust plates to apply a pressure gradient compensating force in a direction which tends to pull away from the gear side face that side of the thrust plate which is subjected to the greatest pressure differential. Thus, the piston construction of my invention affords an extremely novel means for compensating the aforementioned pressure gradient in pumps of the type contemplated.

It will be understood that various modifications which utilize my invention other than those described herein can readily be conceived, the above described embodiments being merely illustrative. For example, reciprocable piston means 130 may be altered in design to comprise merely a stem rigidly secured to the thrust plate and extending rearwardly thereof and having mounted thereon a disc or other form of piston head which is subjected to pumping pressure the same as piston head 130.

Where herein the various parts of the invention have been referred to as being located in the right or left position or in upper or lower position, it will be understood that this is done solely for the purpose of facilitating description, and that such references relate only to the relative positions of the parts as shown in the accompanying drawings.

From the foregoing, it is believed that those familiar with the art will readily recognize, appreciate and undertand the novel concepts and features of the present invention herein described and shown. Obviously, while the invention has been described in relation to a particular few embodiments, numerous variations, changes, and substitutions of equivalents will present themselves to persons skilled in the art, and may be made without necessarily departing from the scope and principal of the invention. As a result, it is not my intention to be limited to any particular form of the invention herein illustrated and described except as may appear in the following appended claims.

I claim:

1. In a pressure generating pump of the type including a housing containing intermeshing gears and having an inlet leading to an outlet leading from said housing, an axially movable relatively thin disc-shaped thrust plate having a sealing surface associatable in sealing relationship with the side face of one of said gears, the side of said thrust plate remote from said sealing surface comprising a motive surface subject to pump generated pressure, and a balance groove formed in and extending circumferentially of the sealing surface of the thrust plate inwardly of the root diameter of the adjacent gear and located primarily on the inlet pressure side of the pump, said balance groove being in communication with discharge pressure fluid and out of communication with inlet pressure fluid.

2. In a pressure generating pump of the type including a housing containing intermeshing gears and having an inlet leading to and an outlet leading from said housing, an axially movable thrust plate having a sealing surface associatable in sealing relationship with the side face of one of said gears, the side of said thrust plate remote from said sealing surface comprising a motive surface subject to pump generated pressure, a first balance groove formed in the sealing surface of the thrust plate primarily on the inlet pressure side thereof and extending only partially around said sealing surface radially inwardly of the root diameter of the gear, and a second balance groove formed in the sealing surface of the thrust plate extending from the outlet pressure side thereof radially outwardly of the root diameter of the gear toward the inlet side thereof, both said first and second balance grooves being in communication with discharge pressure fluid.

3. A pump as claimed in claim 2 wherein additional groove means is formed in said sealing surface which communicates pressure fluid in the second balance groove with pressure fluid in the first balance groove whereby to cause such pressure fluid to circulate from the pump outlet through said second balance groove, and thence through said additional groove means and said first balance groove to the outlet.

4. In a pressure generating pump of the type including a housing containing intermeshing gears and having an inlet leading to and an outlet leading from said housing, an axially movable thrust plate having a sealing surface in sealing relationship with a side face of one of said gears, the side of said thrust plate opposite from said sealing surface comprising a motive surface subject to pump generated pressure, and piston means operatively connected to the inlet pressure side of the thrust plate and subjected to pump generated pressure in a direction which urges the sealing surface of the thrust plate on the inlet pressure side of the pump away from its sealing relationship with the adjacent gear side face.

5. In a pressure generating pump of the type including a housing containing intermeshing gears and having an inlet leading to and an outlet leading from said housing, an axially movable thrust plate having a sealing surface in sealing relationship with a side face of one of said gears, the side of said thrust plate opposite from said sealing surface comprising a motive surface subject to pump generated pressure, and means operatively connected to the inlet pressure side of the thrust plate on the motive surface thereof and responsive to pump generated pressure to urge the sealing surface of the thrust plate on the inlet side thereof away from its sealing relationship with the adjacent gear side face.

6. In a pressure generating pump of the type including a housing containing intermeshing gears and having an inlet leading to and an outlet leading from said housing, an axially movable thrust plate having a sealing surface in sealing relationship with a side face of one of said gears, the side of said thrust plate opposite from said sealing surface comprising a motive surface subject to pump discharge pressure, at least one reciprocable piston means connected to the thrust plate on the inlet pressure side of the pump and extending through the thrust plate to present a motive surface subject to pump discharge pressure in facing relation to said first mentioned motive surface, the pressure force which acts on said second motive surface functioning to urge said piston means in a direction opposite to the urging of the pump discharge pressure which acts on the first mentioned motive surface, whereby said sealing surface on the inlet pressure side of the pump is urged out of sealing relationship with the gear side face.

7. In a pressure generating pump of the type including a housing containing intermeshing gears and having an inlet leading to and an outlet leading from said housing, an axially movable thrust plate having a sealing surface in sealing relationship with a side face of one of said gears, the side of said thrust plate opposite from said sealing surface comprising a motive surface subject to pump discharge pressure, and a second motive surface connected to the thrust plate and disposed in spaced relation therefrom on the inlet pressure side only thereof, said second motive surface being subjected to pump discharge pressure which urges said second motive surface in a direction opposite to the urging of said pump discharge pressure acting on said first motive surface, thus directing a force against the thrust plate at the inlet pressure side thereof which tends to move the sealing surface at the inlet pressure side of the thrust plate away from its sealing relationship with the adjacent gear side face, whereby to tend to compensate for the pressure gradient across the sealing surface which increases from the outlet to the inlet of the pump.

8. In a pressure generating pump of the type including a housing containing intermeshing gears and having an inlet leading to and an outlet leading from said housing, a floating thrust plate having a forward surface in sealing relation with a side face of the adjacent gear, the side of said thrust plate remote from the sealing surface comprising a motive surface, a body portion secured to the housing and forming a pressure chamber with said motive surface, said pressure chamber communicating with pump discharge pressure, said floating thrust plate being subject to such discharge pressure to maintain sealing engagement with the gear side face during operation of the pump, a recess in said body portion, a recess in said thrust plate, said recesses being located generally on the inlet pressure side of the pump and in alignment one with the other, piston means extending through the thrust plate recess and having a motive surface opposite the first mentioned motive surface reciprocable in the body portion recess, and passage means communicating said body portion recess with pump fluid on the inlet side thereof, said chamber pressure fluid directing a force against said second motive surface in a direction opposite to the chamber pressure fluid force directed against the first motive surface for urging the inlet pressure side of the thrust plate away from the adjacent gear side face.

9. A pump as claimed in claim 8 wherein spring means are connected to said piston means urging said second motive surface away from the first motive surface.

10. A pump as claimed in claim 8 wherein a plurality of said piston means are connected to said thrust plate generally on the inlet pressure side thereof and in circumferentially spaced relation one from the other.

11. In a pressure generating pump of the type including a housing containing intermeshing gears and having an inlet leading to and an outlet leading from said housing, a floating thrust plate having a sealing surface in sealing relationship with the side face of one of said gears, the side of said thrust plate remote from said side face comprising a motive surface subject to pump discharge pressure, a balance groove formed in said sealing surface inwardly of the root diameter of the adjacent gear and effective only on the inlet pressure side of the thrust plate in communication with pump generated pressure and piston means operatively connected to the thrust plate on the inlet pressure side thereof for urging a portion only of the thrust plate away from its sealing engagement with the gear side face.

12. A pump as claimed in claim 11 wherein the piston means includes a second motive surface subjected to pump discharge pressure which opposes said first motive surface.

13. A pump as claimed in claim 11 wherein a body portion is connected to said housing, and a chamber in said body portion, said piston means being mounted in said chamber and said chamber communicating with inlet pressure fluid in the pump.

14. A pump as claimed in claim 11 wherein said balance groove extends only along the inlet side of said thrust plate, and a second balance groove located radially outwardly of the root diameter of the adjacent gear and communicating with discharge pressure fluid.

15. A pump as claimed in claim 14 wherein said first and second balance grooves are in communication one with the other.

16. In a pressure generating pump of the type including a housing containing intermeshing gears and having an inlet leading to and an outlet leading from said housing, an axially movable relatively thin disc-shaped thrust plate having a sealing surface side associatable in sealing relationship with the side face of one of said gears and subject during operation of the pump to a pressure difference which increases from inlet pressure at the inlet side of the pump to pump discharge pressure at the discharge side thereof, the side of said thrust plate remote from said sealing surface side comprising a motive surface subject to pump discharge pressure, whereby differential pressure forces act on said thrust plate which tend to twist same toward the pump inlet side, and a balance groove in communication with pump discharge pressure fluid formed in the sealing surface of said thrust plate radially inwardly of the root diameter of the adjacent gear and extending partially around the thrust plate so that the net effect of the force exerted by the pressure fluid on said balance groove tends to counter-act said twisting effect on said thrust plate.

17. A pump as claimed in claim 16 wherein a second balance groove is formed in the sealing surface of the thrust plate on the outlet pressure side thereof and radially outwardly of the root diameter of the adjacent gear in communication with discharge pressure fluid and with the first balance groove.

18. In a pressure generating pump of the type including a housing containing intermeshing gears and having an inlet leading to and an outlet leading from said housing, an axially movable thrust plate having a sealing surface side associatable in sealing relationship with the side face of one of said gears and subject during operation of the pump to a pressure difference which increases from inlet pressure at the inlet side of the pump to pumping pressure at the discharge side thereof, the side of said thrust plate remote from said sealing surface side comprising a motive surface subject to pumping pressure, whereby differential pressure forces act on said thrust plate which tend to force the side thereof adjacent to the pump inlet into sealing relation with the said face of the adjacent gear with greater force than the side thereof at the pump outlet, and a balance groove in communication with discharge pressure fluid formed in the sealing surface inwardly of the root diameter of the adjacent gear and effective on the inlet pressure side of the pump to counteract at least in part the greater sealing force which acts on the thrust plate side adjacent the pump inlet.

19. A pump as claimed in claim 18 wherein a second balance groove is formed in the sealing surface of the thrust plate on the outlet pressure side thereof and radially outwardly of the root diameter of the gear.

20. In a pressure generating pump of the type including a housing containing intermeshing gears and having an inlet leading to and an outlet leading from said housing, an axially movable thrust plate having a sealing surface associatable in sealing relationship with the side face of one of said gears, the side of said thrust plate remote from said sealing surface comprising a motive surface subject to pump discharge pressure, and a balance groove formed in the sealing surface of the thrust plate primarily on the inlet pressure side thereof and extending only partially around said sealing surface radially inwardly of the root diameter of the adjacent gear.

21. In a pressure generating pump of the type including a housing containing intermeshing gears and having an inlet leading to and an outlet leading from said housing, an axially movable thrust plate having a sealing surface associatable in sealing relationship with the side face of one of said gears, the side of said thrust plate remote from said sealing surface comprising a motive surface subject to pump generated pressure, a first balance groove formed in the sealing surface of the thrust plate primarily on the inlet pressure side thereof and extending only partially around said sealing surface radially inwardly of the root diameter of the adjacent gear, a second balance groove formed in the sealing surface of the thrust plate primarily on the outlet pressure side thereof and radially outwardly of the root diameter of the gear, and a third groove formed in said sealing surface communicating pressure fluid in the second balance groove with pressure fluid in the first balance groove, said first and second balance grooves being in communication with pump generated pressure fluid.

22. In a pressure generating pump of the type including a housing containing intermeshing gears and having an inlet leading to and an outlet leading from said housing, a floating thrust plate having a sealing surface in sealing relationship with the side face of one of said gears, the side of said thrust plate remote from said side face comprising a motive surface subject to pump generated pressure, and a balance groove formed in said sealing surface inwardly of the root diameter of the adjacent gear in communication with pump generated pressure fluid and effective primarily only on the inlet pressure side of the thrust plate.

23. In a pressure generating pump of the type including a housing containing intermeshing gears and having an inlet leading to and an outlet leading from said housing, an axially movable thrust plate having a sealing surface associatable in sealing relationship with the side face of one of said gears and subjected to a pressure gradient between the inlet and outlet during operation of the pump, the side of said thrust plate remote from said sealing surface comprising a motive surface subject to pump generated pressure, and a balance groove formed in the sealing surface of the thrust plate extending only partially around said sealing surface primarily on the inlet pressure side and radially inwardly of the root diameter of the adjacent gear, said balance groove being in communication with pump pressure fluid such that a force is exerted on the thrust plate along the length of said balance groove which tends to counter-act the effect of the pressure gradient across said sealing surface.

References Cited in the file of this patent

UNITED STATES PATENTS

| | | |
|---|---|---|
| 2,044,873 | Beust | June 23, 1936 |
| 2,624,287 | Ilyin | Jan. 6, 1953 |
| 2,676,548 | Lauck | Apr. 27, 1954 |
| 2,718,758 | Minshall et al. | Sept. 27, 1955 |
| 2,772,638 | Nagely | Dec. 4, 1956 |
| 2,816,510 | Jarvis | Dec. 17, 1957 |
| 2,853,952 | Aspelin | Sept. 30, 1958 |
| 2,870,719 | Murray et al. | Jan. 27, 1959 |
| 2,870,720 | Lorenz | Jan. 27, 1959 |
| 2,876,705 | Aspelin et al. | Mar. 10, 1959 |
| 2,885,965 | Haberland | May 12, 1959 |
| 2,891,483 | Murray et al. | June 23, 1959 |
| 2,933,047 | Judkins | Apr. 19, 1960 |

FOREIGN PATENTS

| | | |
|---|---|---|
| 769,763 | Great Britain | Mar. 13, 1957 |